L. W. THOMPSON.
ELECTRIC REGULATOR.
APPLICATION FILED FEB. 26, 1915.
1,209,518.
Patented Dec. 19, 1916.
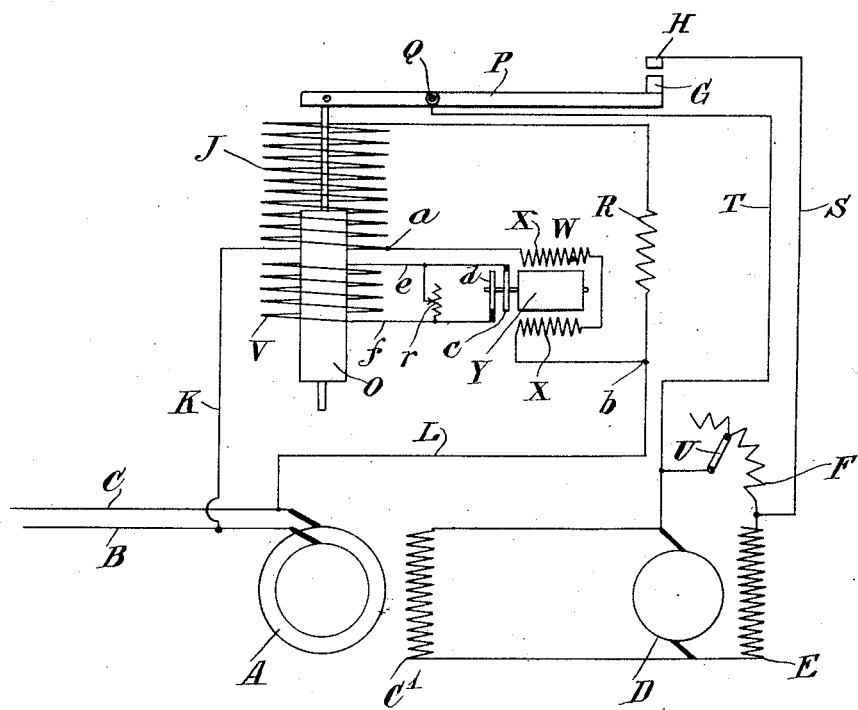

UNITED STATES PATENT OFFICE.

LOUIS WILLARD THOMPSON, OF NEW YORK, N. Y., ASSIGNOR TO GENERAL ELECTRIC COMPANY, A CORPORATION OF NEW YORK.

ELECTRIC REGULATOR.

1,209,518.

Specification of Letters Patent.

Patented Dec. 19, 1916.

Application filed February 26, 1915. Serial No. 10,695.

*To all whom it may concern:*

Be it known that I, LOUIS WILLARD THOMPSON, a citizen of the United States, and a resident of the borough of Manhattan, city, county, and State of New York, have invented certain new and useful Improvements in Electric Regulators, of which the following is a description, accompanied by drawings.

This invention relates to electric regulators, but more particularly to alternating current voltage regulators, for automatically maintaining the voltage of a generator by effecting momentary changes in the field of the generator, such changes being greater than those which would be required to restore the desired voltage if the changed condition in the field of the generator were continuously maintained.

In voltage regulators of this character, in which the momentary changes in the field of the generator are effected in response to the generator voltage, the electrical and mechanical inertia of the parts produces a fluctuation in the generator voltage much greater than the small fluctuation necessary to the operation of the field changing means. This condition, commonly known as "hunting", is highly objectionable.

The primary object of this invention is, therefore, to provide a regulator which shall be substantially free from "hunting". To this end means, to the operation of which fluctuations in the generator voltage are not essential, are employed to impart to the controlling member of the field changing means a vibratory movement. The means to produce this vibratory movement comprise an alternating current circuit, including a low frequency source of alternating current and a winding in operative relation with said controlling member.

In the preferred form of the invention the regulator comprises a controlling solenoid responsive to the conditions of the circuit to be regulated, and an auxiliary solenoid which is energized from the source of low frequency current. The auxiliary solenoid is continuously energized and serves to influence and modify the action of the main controlling solenoid, the energization of which varies with the conditions of the circuit to be regulated.

Obviously, various circuits and connections may be devised without departing from the spirit of the invention, and I am not to be understood as limiting the invention to the apparatus shown and described, which is illustrative of a preferred form of the invention.

The drawing is a diagrammatic representation of circuits and apparatus for carrying out the invention.

Referring to the drawings, A represents an alternating current generator connected to the mains B, C, the voltage upon which is to be regulated. The field C' of the alternator is excited by a direct current exciter D and the voltage of the mains B, C, is regulated by regulating the excitation. The voltage of the exciter D is varied, by varying the strength of its field E, in the circuit of which is shown an exciter rheostat F. This rheostat F, as shown, may be short circuited by means of the contacts G and H controlled by suitable means actuated by the control solenoid J, which is responsive to the conditions of the circuit to be regulated represented by the mains B, C.

To control the contacts G and H, which are preferably made of carbon in order to avoid the usual objections to metal contacts, a lever P, pivoted at Q, carrying contact G at one end and connected to the core O at the other end, is employed. The core O is subjected to the combined influence of a solenoid J, connected across the mains B—C by means of the leads K and L, through a non-inductive resistance R which is preferably inserted as usual in one of the leads, and a solenoid V. The solenoid V is supplied with current of low frequency from the phase wound rotor Y of the induction motor W by means of the slip rings c—d and the leads e—f. A variable resistance r is preferably connected across the leads e—f. The stator windings X—X of the induction motor W are connected to the leads K—L at the points a and b. The frequency of the current supplied to the solenoid V may be adjusted to the desired value by regulating the resistance r which varies the slip of the rotor Y.

The operation of the regulator is as follows: Assume the voltage of the generator to have the desired value. The core O will be vibrated by reason of the current of low frequency supplied to the coil V, and will cause the contacts G—H to be alternately opened and closed, and the relative periods during which said contacts are engaged or disengaged will be such that substantially no change in the voltage of the generator is effected by reason of the alternate engagement and disengagement of said contacts. Now assume the voltage of the generator to increase above the desired value. As before, the core O will be vibrated by means of the solenoid V, but on account of the increased effect of the solenoid J, the range of this vibration, which will be of substantially the same amplitude and frequency as before, will be displaced from the range of the vibration in the first instance with the result that the contacts G and H are in engagement for a shorter portion of each vibration. This results in a decrease in the voltage of the generator. Similarly, if the voltage of the generator falls below the desired value, the vibration of the core O will have the same amplitude and frequency as before, but the range of its vibration will be displaced from the range of its vibration in the previously mentioned instances, with the result that the contacts G and H will be in engagement during a greater portion of the vibration of said core than when the voltage of the generator has the desired value. This results in an increase in the voltage of the generator.

The use of the coil V prevents "hunting," since it is not necessary to the periodic engagement of the contacts G and H that the strength of the solenoid J, and consequently the voltage across the mains B—C, should vary. By the coöperation of the solenoids J and V, energized from their respective sources, the voltage of the generator A is maintained substantially constant and a tendency to "hunting" is avoided.

I claim and desire to obtain by Letters Patent the following:—

1. The combination with an alternating current circuit to be regulated, of a regulator comprising electro-responsive means responsive to a departure from a desired circuit condition, for restoring said desired condition, and means for constantly subjecting said electro-responsive means to an alternating current of very low frequency compared to the frequency of the circuit to be regulated.

2. The combination with an alternating current circuit to be regulated, of a regulator comprising electro-responsive means responsive to a departure from a desired circuit condition, for restoring said desired condition, and means for continuously subjecting said electro-responsive means to a substantially constant alternating current of lower frequency than that of the circuit to be regulated.

3. The combination with an alternating current circuit to be regulated, of a regulator comprising electro-responsive means responsive to a departure from a desired circuit condition, for restoring said desired condition, a constantly operative source of current of lower frequency than that of the circuit to be regulated, and connections for continuously impressing said low frequency current upon the said electro-responsive regulating means, and thereby influencing and modifying the action of said electro-responsive means.

4. The combination with an electric circuit to be regulated, of a regulator comprising a fixed contact, a movable contact associated therewith, a coil responsive to an electrical condition of said circuit, a core for said coil controlling said movable contact, and electromagnetic means, the control of which is independent of the regulator, for continuously imparting a vibratory force to said core.

5. In a regulator, the combination of an electro-responsive device, means for impressing variable alternating current of a given frequency upon said device, means for continuously impressing a substantially constant alternating current of lower frequency upon said device, and regulating means controlled by said device.

6. The combination with an alternating current circuit to be regulated, of a regulator comprising a controlling magnet responsive to the voltage of the circuit to be regulated, and a source of current of lower frequency than that of the circuit to be regulated, for altering the restoring power of said magnet.

7. The combination with an alternating current circuit to be regulated, of a regulator responsive to electrical conditions in said circuit, and a continuously acting source of current of lower frequency than that of the circuit to be regulated, for modifying the action of said regulator when the condition of the circuit approaches that desired, whereby "hunting" is prevented.

8. The combination with an alternating current generator having a field, of a resistance affecting the strength of said field, contacts opening and closing to insert and withdraw said resistance, means responsive to variations of voltage of said generator from a desired value for opening and closing said contacts, said resistance being greater than that which would be required to effect the required change in voltage if continuously applied, and a source of alternating current of lower frequency than the said generator continuously acting on said contact opening and closing means for modifying the action of said means when the voltage of the generator approaches the desired value, whereby "hunting" is prevented.

9. The combination with an alternating current circuit to be regulated, of electro-responsive means, responsive both to the condition in said circuit and to an alternating current of relatively lower frequency than the frequency of said circuit, for maintaining a desired condition in said circuit.

10. In a system of regulation for an alternating current generator, the combination with the generator of a regulator comprising an electromagnet responsive to the generator voltage, means operated by said electromagnet for controlling the generator voltage, and a circuit including a low frequency source of alternating current cooperating with said means to modify the action thereof.

11. In a system of regulation for an alternating current generator, the combination with the generator of a regulator comprising an electromagnet responsive to the generator voltage, means operated by said electromagnet for controlling the generator voltage, and a circuit including a winding of said electromagnet and a low frequency source of alternating current to modify the action of said means.

12. In a system of regulation for an alternating current generator, the combination with the generator of a regulator comprising an electromagnet responsive to the generator voltage, means operated by said electromagnet for controlling the generator voltage, an induction motor having a phase wound secondary adapted to be driven from said generator, and a circuit including a winding of said electromagnet and the secondary of said induction motor to modify the action of said means, and means to vary the relative speeds of the primary and secondary of said induction motor.

In testimony whereof I have signed this specification in the presence of two subscribing witnesses.

LOUIS WILLARD THOMPSON.

Witnesses:
WALTER S. JONES,
HERBERT G. OGDEN.